United States Patent [19]
Peng et al.

[11] Patent Number: 6,024,899
[45] Date of Patent: Feb. 15, 2000

[54] METHOD OF MAKING MESOPOROUS CARBON USING PORE FORMERS

[75] Inventors: Y. Lisa Peng, Big Flats; Jimmie L. Williams, Painted Post, both of N.Y.

[73] Assignee: Corning Incorporated, Corning, N.Y.

[21] Appl. No.: 09/348,392

[22] Filed: Jul. 7, 1999

Related U.S. Application Data

[60] Provisional application No. 60/093,400, Jul. 20, 1998.

[51] Int. Cl.[7] ..................................................... C01B 31/02
[52] U.S. Cl. .......................... 264/29.1; 264/42; 264/45.1; 264/129; 264/177.1; 264/177.2; 423/445 R; 427/228
[58] Field of Search ........................... 264/29.1, 42, 45.1, 264/129, 177.1, 177.2; 427/228; 423/445 R

[56] References Cited

U.S. PATENT DOCUMENTS

| | | |
|---|---|---|
| 3,885,977 | 5/1975 | Lachman et al. . |
| 4,127,691 | 11/1978 | Frost . |
| 4,439,349 | 3/1984 | Everett et al. ..................... 264/29.1 X |
| 4,758,272 | 7/1988 | Pierotti et al. . |
| 4,992,233 | 2/1991 | Swaroop et al. . |
| 5,427,601 | 6/1995 | Harada et al. . |
| 5,488,023 | 1/1996 | Gadkaree et al. . |
| 5,820,967 | 10/1998 | Gadkaree . |

*Primary Examiner*—Leo B. Tentoni
*Attorney, Agent, or Firm*—L. Rita Herzfeld

[57] ABSTRACT

A method of making mesoporous carbon involves combining a carbon precursor and a pore former. At least a portion of the pore former dissolves molecularly in the carbon precursor. The pore former has a decomposition or volatilization temperature above the curing temperature and below the carbonization temperature of the carbon precursor. The carbon precursor is cured, carbonized, and optionally activated, and at the same time the pore former is removed.

14 Claims, No Drawings

METHOD OF MAKING MESOPOROUS CARBON USING PORE FORMERS

This application claims the benefit of U.S. Provisional Application Ser. No. 60/093,400, filed Jul. 20, 1998, entitled "Method of Making Mesoporous Carbon Using Pore Formers, by Peng et al.

This invention relates to a method of making mesoporous carbon by a method that involves combining a carbon precursor and a pore former molecularly, followed by curing carbonizing and optionally activating under conditions to give specific pore sizes and pore size distributions. Mesoporous carbon is especially suited for a variety of uses in catalytic and purification applications.

BACKGROUND OF THE INVENTION

Activated carbon has found use in various applications such as purification of air, water, automotive exhaust, etc. While microporous structure carbon (pore diameter less than 20 angstroms and BET surface area of 1000–3000 $m^2/g$) are suitable for many applications such as gas phase adsorption e.g. light hydrocarbons and $H_2S$, some applications require larger porosity in the carbon for optimum adsorption and/or catalytic activity. For example, removal of larger molecular size pollutants such as humine, protein, etc., in addition to conventional gaseous pollutants, such as hydrocarbons, or certain kinds of pesticides require specific surface properties and pore size distributions. Activated carbon monoliths, whether in the form of a coating on a substrate, or a shaped structure of activated carbon, have found use in various applications especially where durability is required, such as in automotive exhaust purification. For these kinds of structures to be used in chemical processing applications and liquid phase filtration applications, mesoporosity is sometimes required such as for adequate catalyst loading and for facilitating chemical reaction kinetics and filtering processes.

Therefore, a method of making mesoporous carbon, especially in conjunction with monolithic carbon forms, is highly desirable and an advancement in the art.

The present invention provides such forms of mesoporous carbon and method of making.

SUMMARY OF THE INVENTION

In accordance with one aspect of the invention, there is provided a method of making mesoporous carbon that involves combining a carbon precursor and a pore former. At least a portion of the pore former dissolves molecularly in the carbon precursor. The pore former has a decomposition or volatilization temperature above the curing temperature and below the carbonization temperature of the carbon precursor. The carbon precursor is cured, carbonized, and optionally activated, and at the same time the pore former is removed.

DETAILED DESCRIPTION OF THE INVENTION

This invention relates to making mesoporous activated carbon by combining a carbon precursor, and pore-forming materials. At least a portion of the pore forming materials dissolves molecularly in the carbon precursor, that is, typically but not exclusively about 50% of the pore former charge. The precursor is then cured, carbonized and optionally activated.

According to this invention, mesoporous carbon means that at least 50%, and more typically about 60% to 90% of the total pore volume is in the range of 20 to 500 angstroms and no more than 25 percent pore volume is in the range of large pores (>500 angstroms).

By carbon precursor is meant a synthetic polymeric carbon-containing substance that converts to continuous structure carbon on heating. A carbon precursor is preferred over activated carbon particles because as a result of curing, carbonizing and activating, the carbon atoms are arranged in a continuous uninterrupted structure of random three-dimensional graphitic platelets.

For purposes of this invention, a synthetic polymeric carbon precursor, e.g. a synthetic resin in the form of a solution or low viscosity liquid at ambient temperatures or capable of being liquefied by heating or other means is especially useful. Synthetic polymeric carbon precursors include any liquid or liquefiable carbonaceous substances. Examples of useful carbon precursors include thermosetting resins and thermoplastic resins (e.g., polyvinylidene chloride, polyvinyl chloride, polyvinyl alcohol, and the like).

Low viscosity carbon precursors (e.g., thermosetting resins) are preferred for coating applications because their low viscosity allows greater penetration into the substrate. Typical resin viscosity ranges from about 50 to 100 cps. Any high carbon yield resin can be used. By high carbon yield is meant that greater than about 10% of the starting weight of the resin is converted to carbon on carbonization. Phenolic and furan resins are the most suitable. Phenolic resins are most preferred due to their low viscosity, high carbon yield, high degree of cross-linking upon curing relative to other precursors, and low cost. Suitable phenolic resins are resole resin such as 43250 plyophen resin, and 43290 from Occidental Chemical Corporation, and Durite resole resin from Borden Chemical Company. One especially suitable furan liquid resin is Furcab-LP from QO Chemicals Inc.

Solid resins can be used in shaping applications. One especially suited solid resin is solid phenolic resin or novolak.

The carbon precursor can include a single precursor material or a mixture of two or more precursor materials. Optionally, already-made activated carbon can be added to liquid carbon precursor to adjust the viscosity of the precursor for forming or shaping into structures.

By pore former is meant any organic compounds or mixtures that volatilize or decompose at the temperature range above the curing temperature and below the carbonization temperature of the carbon-forming precursor. For example, this temperature range is between 150° C. to 750° C. for a typical phenolic resole resin of viscosity around 50 to 100 cps. Pore formers having a decomposition temperature of about 150° C. to 500° C. are useful, and with about 250° C. to 400° C. being especially suitable. The pore former can either completely decompose or volatilize in the desired temperature range or leave traces of residue after carbonization.

The carbon precursor and the pore former are combined such that at least a portion, and preferably all of the pore former is molecularly dissolved in the carbon precursor. By molecularly, is meant that the pore former must be able to be brought into molecular level dissipation in the carbon precursor. In other words, the pore former is solubilized completely and homogeneously to form a true solution (as opposed to other degrees of miscibility such as colloidal dispersions, etc.) in the carbon precursor to ensure uniform molecular level porosity generation. For either coating or shaping applications, a medium is typically used to carry the pore former (which can also act as a solvent) when it is combined with the carbon precursor. The pore size and distribution created by the pore formers are regulated by the size/molecular weight and amounts of the pore formers dissolved.

It is preferred that the pore-formers be thermoplastic materials. Some especially useful pore formers are thermoplastic polymeric materials, such as polyvinylbutyrals (PVB) of various molecular weights, e.g. 40,000 to 250,000, polyethylene glycols (PEG) of various molecular weights, e.g. about 600 to 10,000, and heavy petroleum fractions and/or coal liquids of various molecular weights. In some special cases, pore formers can be bulky organometallic compounds. Some examples are organo-rare earth metal complexes, such as $X(C_5H_5)_3$ (cyclopentadienyl), and X(acac) (acetylacetonate), where X represents Sm, Y, Yb, and Lu, and transition metal complexes such as Y(acac), where Y represents Fe, Co and Ni. The functions of organometallic compounds are two fold, one being a pore former from decomposition of the hydrocarbon fragments from the metal complexes, the second being catalytic generation of pores from the metals.

In other special cases, the pore former can be a portion of selected carbon precursors. Typically, these would be long chain aliphatic branches of the carbon precursor molecules, so that during curing, a looser frame structure is produced, and the aliphatic long chain branches decompose and leaving pores in the carbon matrix. Some examples are butylated phenolic resins under the name of P97 produced by Borden, and styrenated phenolic resin under the name of LV3020 also produced by Borden chemical.

The various types of the pore forming materials can be used together, providing that they are mutually compatible in their chemical nature, and they at least partially form a true solution with the carbon precursor. The compatibility is especially important for making coated carbon honeycombs, where it is desirable that essentially all, that is, >99% of the pore-former forms a true solution, in other words, dissolves molecularly in the carbon precursor. The desired amounts of pore former have to be dissolved into the liquid carbon precursor to produce a mixture of suitable viscosity for dip-coating. For shaping activated honeycombs, the pore formers and carbon precursor are first dissolved into a suitable common solvent for uniform pore former distribution. The solvent is then removed, leaving the pore formers dissolved in the carbon precursor.

Activation may not be necessary under the current invention. Proper burn-off level and pore size can be reached by adjusting the amounts and sometimes size/molecular weights of the pore forming materials.

One useful method of making the mesoporous activated carbon is to coat an inorganic substrate such as a honeycomb with a homogeneous coating mixture of the carbon precursor and the pore-former followed by curing, carbonizing, and optionally activating the carbon to form a continuous coating of carbon. For example, about 15 wt % of pore former (pore former weight versus resin weight) is first mixed with a conventional solvent such as for example methanol. The mixture is then homogenized with carbon precursor dissolving the pore former. The coating mixture is then coated onto a substrate, e.g. a monolithic substrate such as one made of cordierite. This is then cured at about 150° C., after drying at about 90–100° C., and then carbonized and optionally activated.

The substrate has an outer surface from which pores extend into the substrate. The coating penetrates into and is distributed throughout these pores as a coating thereon.

In its most useful form the monolithic substrate has means for passage of a fluid stream therethrough, e.g., a network of pores communicating from the outside to the inside, and/or through channels extending from one end of the monolith to the other for passage of the fluid stream into one end and out through the other end.

The substrate must have enough strength to function in the application and be capable of withstanding the heat-treating temperature experienced in forming the activated carbon coating.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, clays, and combinations thereof. By combinations is meant physical or chemical combinations, eg., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium aluminosilicates, spinel, alumina, silica, silicates, borides, aluminosilicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. No. 4,127,691 and U.S. Pat. No. 3,885,977. Those patents are herein incorporated by reference as filed.

Suitable metallic materials are any metal or alloy or intermetallic compound that provides durable structural service, and does not soften below about 600° C. Particularly useful are alloys, which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5–20Al5–40Cr, and Fe7–10Al10–20Cr powders with other possible additions are especially suited. Some typical compositions of metal powders for forming substrates are disclosed in U.S. Pat. Nos. 4,992,233, 4,758,272, and U.S. Pat. No. 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

The substrate is preferably a honeycomb or matrix of thin walls forming a multiplicity of open ended cells extending between the ends of the honeycomb.

Generally honeycomb cell densities range from 235 cells/$cm^2$ (about 1500 cells/$in^2$) to 1 cell/$cm^2$ (about 6 cells/$in^2$). Some examples of commonly used honeycombs in addition to these, although it is to be understood that the invention is not limited to such, are about 94 cells/$cm^2$ (about 600 cells/$in^2$), about 62 cells/$cm^2$ (about 400 cells/$in^2$), or about 47 cells/$cm^2$ (about 300 cells/$in^2$), and those having about 31 cells/$cm^2$ (about 200 cells/$in^2$). Typical wall thicknesses are for example, about 0.15 mm for about 62 cells/$cm^2$ (about 400 cells/$in^2$) honeycombs. Wall (web) thicknesses range typically from about 0.1 to about 1.5 mm. The external size and shape of the body is controlled by the application.

Cordierite honeycombs are especially preferred as substrates for the mesoporous activated carbon.

The contacting is done by any method suitable to bring the carbon precursor-pore former intimate mix in intimate contact with the inorganic substrate. Exemplary methods of contacting include dipping the substrate in the carbon precursor/pore-former or spraying a carbon precursor/pore-former directly onto the substrate.

Another useful method of making the activated carbon with pore former is to shape a mixture of the pore-former and carbon precursor, binders and/or fillers, and forming aids, such as by extrusion.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some fillers that are suited include both natural and synthetic, hydrophobic, and hydrophilic, fibrous and nonfibrous, carbonizable and non-carbonizable fillers.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

It is important to distinguish the role of the hydrophobic organic fillers and the pore formers. Although they are both fugitive materials, the former is in the form of fine solid powder and is physically mixed with the carbon precursor and other batch ingredients. The pores thus formed will be larger pores in the range of microns, controlled by the size of the solid filler particles. The pore formers, however, are molecularly dissolved into the carbon precursor. They are in the form of single molecules or, at most, aggregates of a few molecules. They are confined in the resin matrix after curing. After carbonization, the pores that are left are in the mesopore range.

Some binders and fillers that are especially suited are described in U.S. Pat. No. 5,820,967 filed May 20, 1996. That patent is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

The carbon precursor is then subjected to heat-treatments to convert the carbon precursor to continuous carbon (carbonize). The resulting carbon is then optionally heat-treated to activate the carbon and produce an activated carbon structure.

When the carbon precursor is a thermosetting resin, the carbon precursor is cured prior to activation and most typically prior to carbonization. The curing is accomplished typically by heating the precursor to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature.

Carbonization is the thermal decomposition of the carbonaceous material, thereby eliminating low molecular weight species (e.g., carbon dioxide, water, gaseous hydrocarbons, etc.) and producing a fixed carbon mass and a rudimentary pore structure in the carbon.

Such conversion or carbonization of the cured carbon precursor is accomplished typically by heating to a temperature in the range of about 600° C. to about 1000° C. for about 1 to about 10 hours in a reducing or inert atmosphere (e.g., nitrogen, argon, helium, etc.).

Curing and carbonizing the carbon precursor results in substantially uninterrupted carbon, where the carbon is in the form of a coating, the carbon coating is anchored into the porosity of the substrate and as a result is highly adherent. The top surface of the carbon coating is an uninterrupted layer of carbon to carbon bonds. If interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high catalytic capability despite a relatively low carbon content, high strength, and high use temperatures. Structures can be formed which contain carbon in an amount less than and up to about 50% often less than and up to about 30% of the total weight of the substrate and carbon.

After carbonization, pores will be left in the carbon matrix formed from the pore-forming agent, because the pyrolyzing polymer or pore former will have vanished. Controlling the relative size and amount of pore forming agent will provide a way to obtain mesoporous carbon and tailored pore size distributions.

Depending on the final use of the mesoporous carbon, the carbonized material may or may not be activated.

Activating is done to enhance the pore volume and to enlarge the diameter of the micropores formed during carbonization, as well as to create new porosity. Activation is done by known methods such as exposing the structure to steam at high temperatures (e.g., about 600° C. to about 1000° C.).

One advantage of the method of using thermoplastic polymeric fugitive pore-forming materials in this invention is that no other materials are required to obtain mesoporosity. Therefore, the product is relatively pure and does not need to be subjected to subsequent purification. This affords greater flexibility in its use with minimal processing.

To more fully illustrate the invention, the following non-limiting examples are presented. All parts, portions, and percentages are on a weight basis unless otherwise stated.

EXAMPLE 1

Polyvinylbutyrals (PVB) as Pore-Forming Polymers

Methanol-based phenolic resin, SL850E produced by Borden Incorporated, having a viscosity of typically 100 cp, is mixed with polyvinylbutyral using a weight of about 15% of the total weight of PVB+resin. The molecular weights of various PVB can be around 40 to 250 (weight average in thousands). Polyvinylbutyral is first dissolved into a small amount of methanol to facilitate the mixing with phenolic resin. Ceramic substrates of various geometries can be used for dip coating using the prepared solution. The dip-coated parts are then dried at 85° C. and cured at about 100° C. overnight. The cured parts are subjected to 750° C. carbonization for 0.5 hr to remove volatiles and pore-forming agents. Polyvinylbutyral is expected to decompose and leave the carbon matrix at about 300–400° C. The resulting carbon has a surface area of 200 $m^2/g$ and 95% of pore volume is in the mesopore range. Mesoporous carbon is thus made without an activation step.

EXAMPLE 2

Low Molecular Weight Polyethylene Glycols (PEG) as Pore-Formers

Polyethylene glycol of molecular weight about 8000 was dissolved into a small amount of methanol first. The amount of PEG used corresponds to 5 wt %, 15 wt % and 30 wt %, based on the weight of liquid phenolic resin. The mixture is then dissolved and homogenized with the resin. The thus-made resins are dip-coated into the bare ceramic honeycomb having mean porosity around 50%, dried at around 80° C., cured at 150° C., and carbonized in nitrogen at 750° C. The carbonized samples have surface areas of 530, 450 and 350 $m^2/g$, and mesopore contents of 65%, 83% and 90% are obtained.

EXAMPLE 3

Using Thermoplastic Coal Tar Pitch as Pore Forming Materials

Methanol based phenolic resole, such as SL850E obtained from Borden Chemical, is used. A 250 pitch from Coopers Creek Chemical, boiling point of ~250° C., is dissolved into methanol first and then the mixture into the phenolic resole SL850E. The amount of coal tar pitch is 30%, of the total weight of resin and coal tar pitch. The conventional drying, curing, and carbonization procedure is followed. A mesoporous carbon having predominantly 100 angstrom pores is thus produced after carbonization. This carbon has surface area of 320 $m^2/g$ and mesopore content of 72%.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making mesoporous carbon, the method comprising:

a) combining a carbon precursor and a pore former, wherein at least a portion of the pore former dissolves molecularly in the carbon precursor, said pore former having a decomposition or volatilization temperature above the curing temperature and below the carbonization temperature of the carbon precursor;

b) curing the carbon precursor; and c) carbonizing the carbon precursor and removing the pore former to form mesoporous carbon.

2. A method of claim 1 comprising the additional step after the carbonization step of activating the carbon to produce activated carbon having mesoporosity.

3. A method of claim 1 wherein the carbon precursor is a thermosetting resin.

4. A method of claim 3 wherein the carbon precursor is phenolic resin.

5. A method of claim 1 wherein the pore-former has a decomposition temperature of about 150° C. to 500° C.

6. A method of claim 5 wherein the pore-former has a decomposition temperature of about 250° C. to 400° C.

7. A method of claim 1 wherein the pore former is a thermoplastic material.

8. A method of claim 7 wherein the pore-former is selected from the group consisting of polyethylene glycols of molecular weights of about 600 to 10,000 and polyvinylbutyrals of molecular weights of about 40,000 to 250,000.

9. A method of claim 7 wherein the pore-former is selected from the group consisting of heavy petroleum, coal fractions, and combinations thereof.

10. A method of claim 1 wherein the carbon precursor and essentially all of the pore former are combined molecularly and applied as a coating on a substrate.

11. A method of claim 10 wherein the substrate is a honeycomb.

12. A method of claim 1 wherein after step a, the carbon precursor and pore former are then mixed with binders and shaped into a body.

13. A method of claim 12 wherein the shaping is done by extrusion.

14. A method of claim 13 wherein the carbon precursor, pore former, and binder are extruded into a honeycomb.

* * * * *